(12) United States Patent
Strimpel et al.

(10) Patent No.: US 9,891,041 B2
(45) Date of Patent: Feb. 13, 2018

(54) APPARATUS AND METHOD FOR MEASURING THICKNESS OF TRANSPARENT AND/OR TRANSLUCENT MEDIUMS USING A REFLECTING SIGNAL THAT IS NORMAL OR NEAR NORMAL TO THE MEDIUMS

(71) Applicant: EDTM, Inc., Toledo, OH (US)

(72) Inventors: Nathan Strimpel, Milan, MI (US); Jed Martens, Wayne, NE (US); Mark A. Imbrock, Sylvania, OH (US); Jeffrey A. Simpson, Wayne, NE (US)

(73) Assignee: EDTM, INC., Toledo, OH (US)

( * ) Notice: Subject to any disclaimer, the term of this patent is extended or adjusted under 35 U.S.C. 154(b) by 132 days.

(21) Appl. No.: 14/834,580

(22) Filed: Aug. 25, 2015

(65) Prior Publication Data

US 2016/0069667 A1    Mar. 10, 2016

Related U.S. Application Data

(60) Provisional application No. 62/047,166, filed on Sep. 8, 2014.

(51) Int. Cl.
*G01B 11/06* (2006.01)
*G01B 7/00* (2006.01)

(52) U.S. Cl.
CPC .......... *G01B 11/0633* (2013.01); *G01B 7/003* (2013.01)

(58) Field of Classification Search
CPC ............ G01B 11/0625; G01B 11/0633; G01N 21/958; G01N 2021/9586
See application file for complete search history.

(56) References Cited

U.S. PATENT DOCUMENTS

| | | | | |
|---|---|---|---|---|
| 8,723,944 B1* | 5/2014 | Imbrock | ............... | G01B 17/025 324/663 |
| 2007/0074415 A1* | 4/2007 | Gagnon | ................. | B64D 15/20 33/630 |
| 2008/0068619 A1* | 3/2008 | Vial | ..................... | B60R 16/0237 356/630 |
| 2013/0273237 A1* | 10/2013 | Johnson | .................. | C23C 16/50 427/9 |
| 2014/0185060 A1* | 7/2014 | Doerband | .............. | G01N 21/94 356/630 |

* cited by examiner

*Primary Examiner* — Shawn Decenzo
(74) *Attorney, Agent, or Firm* — MacMillan, Sobanski & Todd, LLC (57) ABSTRACT

Methods and apparatuses for measuring the thickness on at least one transparent or translucent medium and detecting the presence and/or location of any conductive coating on a non-conductive medium surface are described.

20 Claims, 4 Drawing Sheets

FIG. 3 ns, it is not possible to differentiate a valid surface reflection from an internal surface reflection.

Therefore, there is a continuing need for an improved, reliable and efficient method and device to detect the presence, location and type of coating applied to various media.

APPARATUS AND METHOD FOR MEASURING THICKNESS OF TRANSPARENT AND/OR TRANSLUCENT MEDIUMS USING A REFLECTING SIGNAL THAT IS NORMAL OR NEAR NORMAL TO THE MEDIUMS

CROSS-REFERENCE TO RELATED APPLICATION

The present invention claims the benefit of the provisional patent application Ser. No. 62/047,166, filed Sep. 8, 2014, which is expressly incorporated herein by reference.

TECHNICAL FIELD

This invention relates to an apparatus and a method for detecting the presence and location of a conductive coating on a non-conductive medium surface.

In another aspect, the invention relates to a system for providing an improvement in the accuracy of thickness measurements of such medium using one or more light sensors.

BACKGROUND

It is often helpful in the glass industry, as well as other transparent medium industries, to detect the presence and surface location of conductive coatings that are applied to the surface of the non-conductive medium. Some of these coatings are classified as low emissivity (low E) coatings. These coatings are typically not visible and therefore difficult to detect without electronic assistance.

In measuring the thickness of transparent mediums such as glass and acrylic plus many others, instruments often utilize a charge coupled device (CCD array) linear image array.

One system is disclosed in the Imbrock et al. U.S. Pat. No. 8,723,944 B1, issued May 13, 2014, which was invented by several of the co-inventors herein. In the Imbrock et al. '944 system, the CCD arrays are positioned in a linear plane with an energy source, such as a laser. The instrument is positioned flat against the glass surface so that the energy of the source exits the aperture of the instrument, striking the mediums front and back surface and reflecting back onto the CCD array. In the Imbrock et al. '944 patent, the CCD array inside the enclosure of the device positioned in parallel to the substrate surface being tested. This results in a laser/energy reflection that is striking the sensor at an angle. One difficulty that occurs when the reflecting energy approaches the CCD array at an angle, is that the reflected energy will reflect inside the bandpass filter, as well as within the protective glass surface of the CCD array itself. These extra internal reflections, are in addition to the internal reflections that naturally occur within the substrate material being tested (See PRIOR ART FIG. 1). Now instead of having a set of four (4) clean reflections from the substrate surface, the sensor will measure numerous internal reflections that are created by a reflective coating, both in the substrate surface, as well as within the bandpass filter and protective glass of the CCD array, compounded by the extra internal reflections inside the substrate.

The more reflective the coating that is on the substrate, the stronger the internal reflections that will appear on the sensors measured values. When these internal reflections begin to have a measured valued that is in any way comparable to the desired (legitimate) substrate surface reflec-

BRIEF SUMMARY OF THE INVENTION

This invention generally relates to a system for detecting conductive coatings on one or more surfaces of non-conductive mediums.

In a first aspect, there is provided an apparatus for measuring thicknesses of at least one transparent or translucent medium, comprising:
   a light energy source configured for directing light energy to at least one transparent and/or translucent medium; and,
   a light sensor configured to receive reflected light energy reflected from the at least one transparent and/or translucent medium;
   the light sensor being configured to receive near normal incidence reflected light energy from the at least one transparent and/or translucent medium.

The light sensor is generally configured to remove one or more internal reflections that occur when the light energy is being reflected from the at least one transparent and/or translucent medium.

In certain embodiments, the light sensor is arranged in a position in the apparatus such that the light sensor is at a near normal incidence to the reflected energy.

In certain other embodiments, the light sensor is arranged in a position in the apparatus such that the light sensor is substantially not parallel to the at least one transparent and/or translucent medium. In such embodiments, the apparatus further includes at least one reflective medium (such as a mirror) positioned to cause the reflected light energy to the light sensor at a near normal incidence.

In certain embodiments, the light sensor is configured to be movable to a position that is at near normal incidence to reflected light energy prior to the light source generating light energy toward the at least one transparent and/or translucent medium.

In certain embodiments, the apparatus further includes a housing, the light sensor being movably attached within the housing by at least one mounting fixture configured to position the light source at near normal incidence to the reflected light energy.

In certain embodiments, the apparatus further includes housing, the light energy source being movably attached within the housing by at least one mounting fixture configured to allow the reflected light to contact the light sensor at near normal incidence.

In certain embodiments, the apparatus a housing, where the light sensor is movably attached within the housing by at least a first mounting fixture configured to position the light source incidence; and, the light energy source is movably attached within the housing by at least a second mounting fixture configured to allow the reflected light to contact the light sensor at near normal incidence.

In certain embodiments, the first and second mounting fixtures are configured to move each of the light energy source and the light sensor independently of each other, either simultaneously or sequentially.

In certain embodiments, the light sensor comprises a 2-dimensional array.

In certain embodiments, the apparatus further includes at least one filter positioned between the light sensor and the reflected light energy.

In certain embodiments, the filter comprises a bandpass filter or a notch filter.

In certain embodiments, the light sensor comprises a charge coupled device" (CCD) array or a "complementary metal oxide silicon" (CMOS) array comprised of a plurality of light sensing elements.

In certain embodiments, the light sensor is further configured to measure two or more transparent and/or translucent mediums.

In certain embodiments, the light sensor is further configured to measure a width of a gap between two spaced-apart transparent and/or translucent mediums.

In certain embodiments, the light sensor is further configured to measure a reflected light when one or more of the transparent and/or translucent mediums have a coating on at least one surface.

In certain embodiments, the apparatus further includes a processor configured for correlating a width of at least one gap between two or more spaced-apart transparent and/or translucent mediums.

In certain embodiments, the light sensor comprises an array having of a plurality of sensor elements configured to regulate energy carryover effects from one sensor element to another sensor element.

In certain embodiments, the apparatus further includes a capacitive-measuring sensor configured to generate a capacitance value in the presence of a conductive layer on a surface of at least one non-conductive medium; and, a processor configured for identifying the presence and surface location of one or more conductive coatings on at least one surface of the non-conductive medium by correlating a value of the capacitance measured with the thickness of the non-conductive medium.

In certain embodiments, the processor is configured for comparing: at least one measured capacitance value and/or any results occurring from a changing capacitance value, to a range of stored capacitance values and/or trigger points corresponding to the thickness of the non-conductive medium.

In certain embodiments, the capacitance-measuring sensor comprises sensing plates that are configured to form an electric circuit with a conductive coating, when the coating is present on one or more of the transparent and/or translucent mediums.

In certain embodiments, the processor is configured for: 1) controlling intensity of energy from the energy source as the energy is directed to the medium; and/or 2) adjusting sensitivity of the light sensor as the energy source is directed to the medium; and/or 3) adjusting a shutter speed of the light sensor as the energy source is directed to the medium.

In certain embodiments, the processor is configured to monitor the intensity of near normal reflections of the energy from the transparent and/or translucent medium onto the light sensor; and, substantially prevent the measured energy near normal reflections from saturating or entering any other undesirable state.

In certain embodiments, the processor is configured for controlling the amount of time the energy source directs energy onto the at least one transparent and/or translucent medium.

In another broad aspect, there is provided a method for measuring thicknesses of at least one transparent or translucent medium, comprising:

directing light energy to at least one transparent and/or translucent medium; and, providing a light sensor configured to receive reflected light energy reflected from the at least one transparent and/or translucent medium; the light sensor being configured to receive near normal incidence reflected light energy from the at least one transparent and/or translucent medium.

In certain embodiments, the method includes moving the light sensor to a position in the apparatus such that the light sensor is at a near normal incidence to the reflected energy.

In certain other embodiments, the method where the light sensor is in a position in the apparatus such that the light sensor is substantially not parallel to the at least one transparent and/or translucent medium. In such embodiments, the method further includes positioning at least one reflective medium (such as a mirror) so as to re-direct the reflected light energy to the light sensor at a near normal incidence.

In certain embodiments, the method includes moving the light sensor to a position that is at near normal incidence to reflected light energy prior to the light source generating light energy toward the at least one transparent and/or translucent medium.

In certain embodiments, the method includes moving both the light energy source and the light sensor, either simultaneously, or sequentially.

Various objects and advantages of this invention will become apparent to those skilled in the art from the following detailed description of the preferred embodiment, when read in light of the accompanying drawings.

BRIEF DESCRIPTION OF THE DRAWINGS

The patent or application file may contain one or more drawings executed in color and/or one or more photographs. Copies of this patent or patent application publication with color drawing(s) and/or photograph(s) will be provided by the Patent Office upon request and payment of the necessary fee.

PRIOR ART

DETAILED DESCRIPTION OF THE INVENTION

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, the preferred methods and materials are described herein.

The system described herein is useful to readily and accurately detect conductive coatings on one or more surfaces of non-conductive mediums. The system is also useful to detect such coatings on mediums that have varying thicknesses, and further, to detect such coatings on structures that contain multiple mediums that may have varying gap distances/separations between the various mediums of the structure. Non-limiting examples of such measurable media include, for example, but are not limited to one or more of: architectural windows with or without coatings or layers of light-altering materials; coated films on glass or plastics; glass such as automobile windows, adjustable darkness glass, user adjustable privacy glass, eyeglass lenses; plastics such as windows, storage containers; and, transparent metal layers such as those found in photovoltaic devices and solar panels.

The system relates generally to detecting the presence, location and type of coating applied to various transparent mediums, or materials, where such coating(s) is deposited directly to the surface or left on the transparent mediums during the manufacturing process (such as glass or plastic), and where such coating(s) may be on a single sheet of the medium and/or multiple spaced sheets of the medium. It is to be understood that the multiple spaced sheets may be comprised of the same or different types and/or thicknesses of mediums.

In the coating industry, there also are numerous applications where coatings are applied to a transparent surface. Some of these applications include flat glass, windows, LCD screens, solar cell panels, thermal efficient films, as well as many other plastic and glass applications. During the processing of these flat materials, it is often desirable to have an apparatus that is able to detect the presence and location of the "invisible" coatings. The coatings may be located on one or both surfaces of a single piece of the medium, or on one or more surfaces of multiple pieces of the medium materials built into an assembly, separated by a known transparent media such as air or a gas.

In one aspect, the invention relates generally to an improvement in the Imbrock et al. U.S. Pat. No. 8,723,944, which is owned by the assignee herein and which patent is fully and expressly incorporated herein by reference.

Described herein is a system that is now capable of identifying both: i) the thicknesses of the non-conductive mediums, and ii) the width of the gap between adjacent mediums. The detection system is especially useful with many different types of products and is capable of making accurate measurements concerning the conductive coatings on such mediums.

Since the detection system includes measuring additional information on the medium thickness and the gap width, the detection system herein is capable of handling many more variations that are found in the field.

The detection system first identifies the glass thickness, then accessing calibration data for the designated glass thickness and compares the calibration data against a data set containing stored "known" values. The method also includes the step of comparing the calibration data against the variations in gap widths in the multi-pane assembly.

It is to be understood that various suitable algorithms or mathematical techniques for generating and/or processing the final result output signal can be used. Further, the detection system may be controlled and/or operated by conventional control and/or operational systems, including, but not limited to various software instructions and/or programs. It is to be understood that such instructions and programs are readily available to, or readily programmable, without undue experimentation from the descriptions as provided herein. It is to be understood that the detection system described herein can be used with one or more software programs which include calibration data that compare all possible combinations of single and/or multi-pane glass assemblies. By having this data stored in the software, the system described herein can accurately detect and/or measure work across a greater variance in glass and gap combinations.

Figure 1:
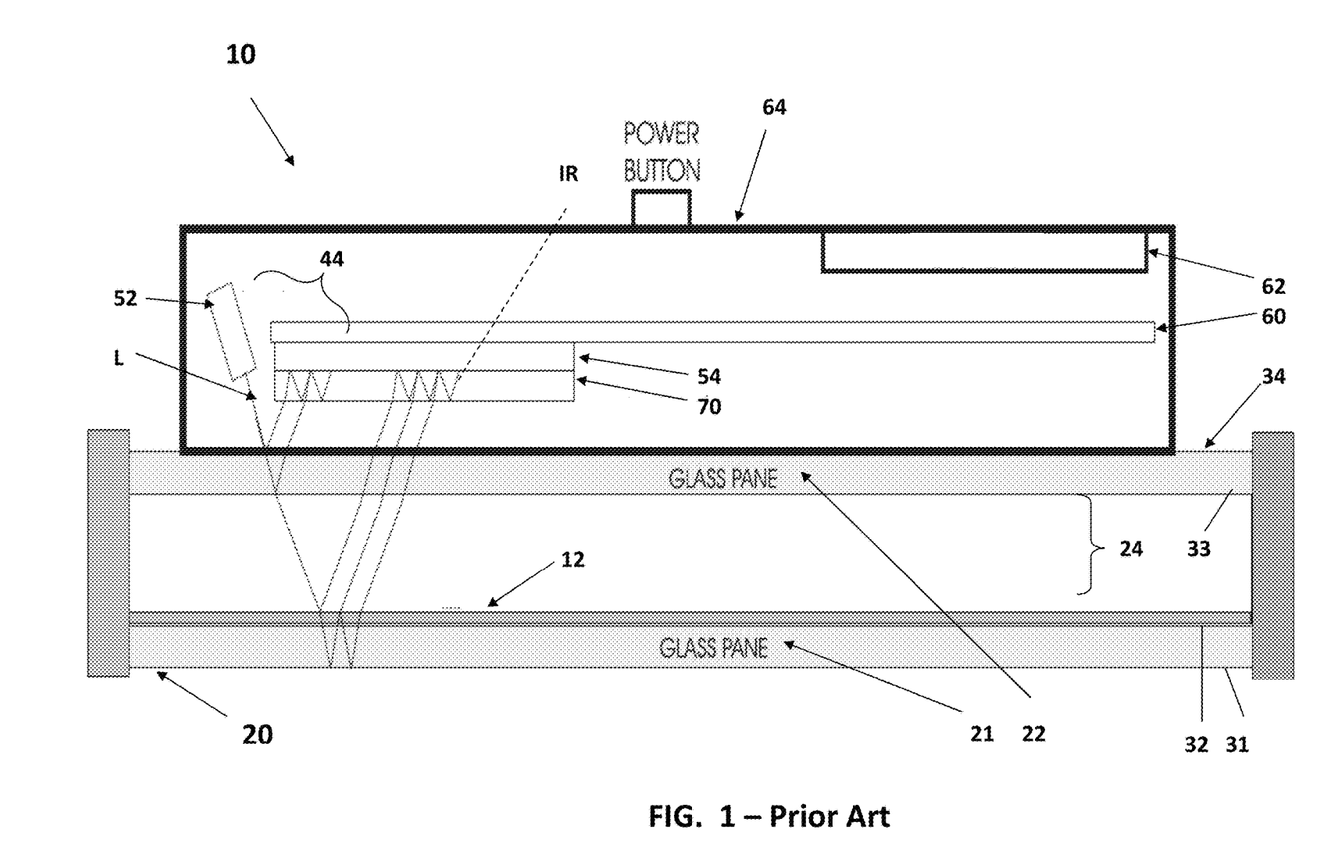
FIG. 1 is a schematic illustration of an apparatus for detecting a coating on a non-conductive medium.

Referring now to PRIOR ART FIG. 1, there is schematically illustrated a detection system 10 for detecting the presence and location of one or more coatings on at one or more non-conductive mediums, as described in the Imbrock et al. '944 patent.

In the embodiment illustrated in PRIOR ART FIG. 1, an assembly 20, such as a dual pane window assembly, is shown as including a first medium 21 in a spaced apart relationship to a second medium 22. In the embodiment illustrated, the assembly 20 includes four (4) surfaces: the first medium 21 has a first (or, outer) surface 31 and a second (or, inner) surface 32, and the second medium 22 has a third (or, inner) surface 33 and a fourth (or, outer) surface 34. The second (or, inner) surface 32 of the first medium 21 is depicted as having a coating 12 in order to aid in the explanation herein.

In the embodiment illustrated in PRIOR ART FIG. 1, the detection system 40 generally includes a thickness-measuring (e.g., reflection) sensor 44 to detect (and then confirm) the presence and location of a coating 12 on the one or more surfaces of mediums 21 and/or 22.

In the embodiment illustrated in PRIOR ART FIG. 1, the thickness-measuring sensor 44 includes a light source 52, one or more light sensing elements 54, and a filter 70, such as a bandpass or a notch filter 70. The light source 52 directs one or more beams of light energy, shown by line L, through the second medium 22, the gap 24 and the first medium 21.

Reflections of the light beam L from the light source 52 pass through, and are internally reflected within (as shown by lines "IR") in the filter 70. The internally reflected light IR is then measured on the one or more light sensors 54. Once the detection system 140 has evaluated the beam reflections Lr, the results can be displayed via various indicators on a control or display panel 62. In addition, or alternately, one or more output ports 64 can be provided on the detection system 140 to supply data to an outside processor (not shown).

Figure 2:
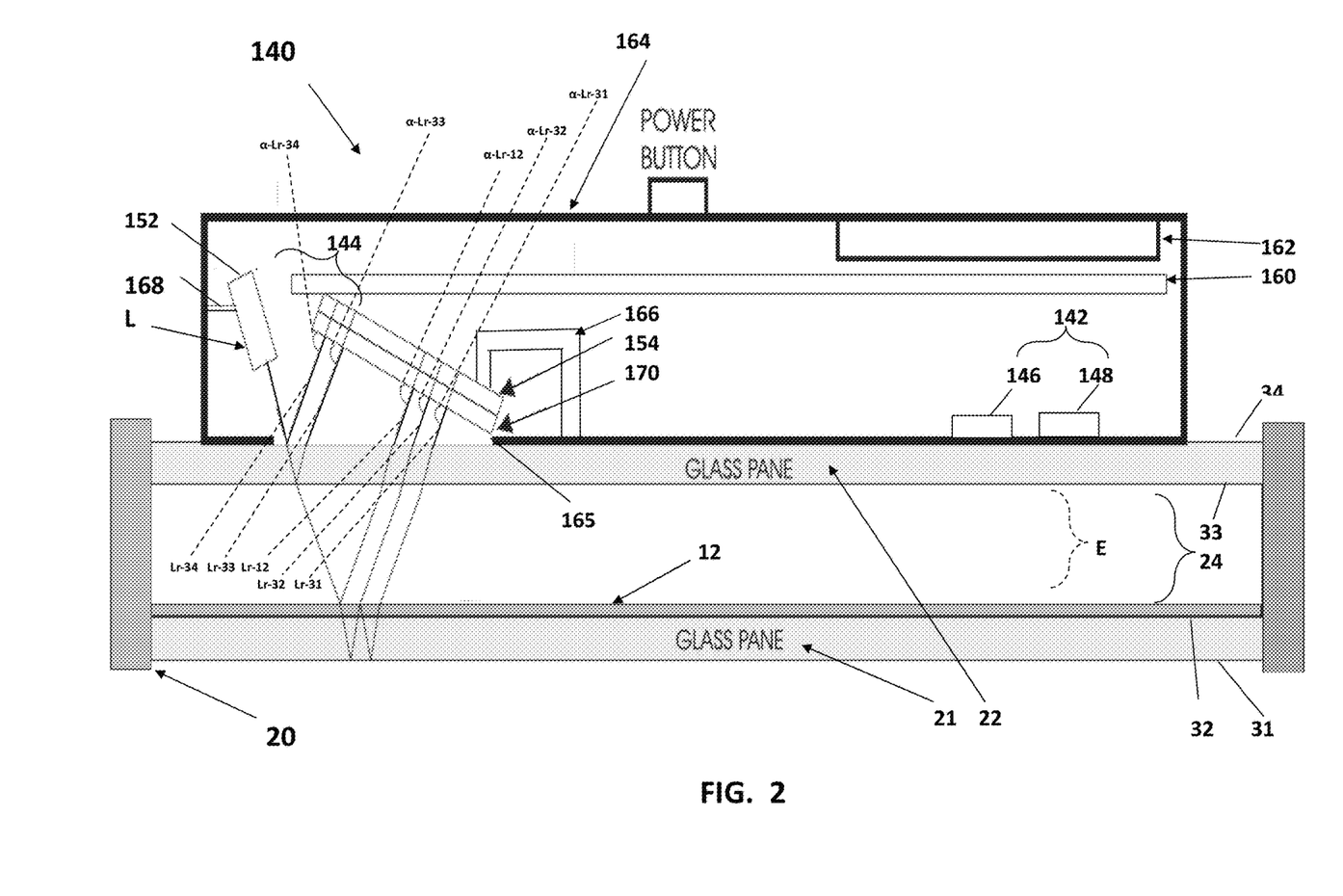
FIG. 2 is a schematic illustration of an apparatus for detecting a coating on a non-conductive medium.

Referring now to FIG. 2, there is schematically illustrated a detection system 140 for which solves the problem of internal reflections.

In the embodiment illustrated in FIG. 2, the same type of assembly 20, such as a dual pane window assembly, is shown for ease of contrasting the present system from that of the prior art system shown in PRIOR ART FIG. 1, and the numbering of such is kept the same. Thus, the assembly 20 includes a first medium 21 in a spaced apart relationship to a second medium 22. It is to be understood that the mediums 21, 22 can be part of a multi-pane window assembly, such as a triple pane window assembly, etc., and that the dual-pane assembly 20 shown in FIG. 2, is only shown for ease of explanation.

The first and second mediums 21 and 22, respectively, are separated by a gap 24. It is to be understood that such gap between may contain air, a gas (e.g., argon, krypton, etc.), or, in some configurations, a vacuum.

In the embodiment illustrated in FIG. 2, the assembly 20 includes four (4) surfaces: the first medium 21 has a first (or, outer) surface 31 and a second (or, inner) surface 32, and the second medium 22 has a third (or, inner) surface 33 and a fourth (or, outer) surface 34. The second (or, inner) surface 32 of the first medium 21 is depicted as having a coating 12 in order to aid in the explanation herein.

In the embodiment illustrated in FIG. 2, the detection system 140 generally includes a thickness-measuring (e.g., reflection) sensor 144 to detect (and then confirm) the presence and location of a coating 12 on the one or more surfaces of mediums 21 and/or 22. It is to be understood that the detection system 140 can be configured to optionally further include a capacitance-measuring sensor 142 such that the thickness-measuring sensor 144 and the capacitance-measuring sensor 142 can be operated substantially simultaneously, or operated in a sequential manner.

In such embodiments which include the capacitance-measuring sensor 142, such sensor 142 can generally include opposing plates 146, 148 that form capacitors with the conductive coating 12 as follows: the capacitance-measuring sensor 142 creates an electric field E, as shown in FIG. 2, from one plate 146 through the second medium 22, through the gap 24, and toward the first medium 21 and the coating 12. The electric field E thus passes through the coating 12, and back to the opposing plate 148 such that an electric circuit is completed. Thus, depending on the signals detected, the capacitance-measuring sensor 142 determines whether any coating 12, is in fact present, and further determines the location of the coating 12 (i.e., on the inner/outer surfaces and/or on the first/second mediums).

In the embodiment illustrated in FIG. 2, the thickness-measuring sensor 144 includes a light source 152 and one or more light sensors 154.

The light source 152 directs one or more beams of light energy, shown by line L, through the second medium 22, the gap 24 and the first medium 21. The light L can comprise any light having a desired wavelength which can be modified, depending on end-use requirements. The light source 152 can be aligned to direct one or more light beams L at a predetermined angle, for example, at about 30 degrees; in other embodiments the angles can be in the range of 30-60 degrees. It is to be understood that various suitable sources of light energy can be used herein. Non-limiting examples include LEDs, IR (infra-red) laser, although other suitable light sources may be used.

In certain embodiments, the apparatus 140 can be generally be enclosed in a housing 164 having one or more openings 165 through light energy L and reflected light Lr's pass, as further described herein.

Reflections (schematically illustrated as "Lr's") of the light beam L from the light source 152 are measured on the one or more light sensors 154. In certain non-limiting embodiments, the light sensor 154 can be comprised of one or more linear (charged coupled device) CCD arrays. In other non-limiting embodiments, the light sensor can be comprised of "complementary metal oxide silicon" (CMOS) arrays.

The light sensor 154 is able to determine reflected energy from multiple reflecting surfaces (i.e., the first and second surfaces 31, 32 of the first medium 21 and the third and fourth surfaces 33, 34 of the second medium 22).

The light sensor 154 is positioned such that the light energy reflected to the light sensor 154 strikes the sensor 154 at a near normal incidence. When the light energy travels at a normal incidence to a medium, there is no energy that reflects within the medium that travels "further down the medium", being re-radiated at a different exit point. Near normal incidence causes all of the energy that might be reflected within the medium to stay within the original ray of travel, reinforcing the original signal strength.

As shown in FIG. 2, the light sensor 154 is positioned inside the enclosure at an angle that will be normal or near normal to the received "α" angles of the beams of reflected energy. As generally shown in FIG. 2, the received "α" angles for each of α-Lr-12, α-Lr-31, α-Lr-32, α-Lr-33 and α-Lr-34 reflected beams that are striking the light sensor 154 are at least near normal incidence. As shown in FIG. 2, the near normal incidence is of normal incidence.

Reflected light energy, shown by lines "Lr" from the first and second mediums 21, 22 and the coating 12 is reflected back to the light sensing element 154.

As illustrated in FIG. 2, a portion Lr-34 of the beam L is reflected by the fourth (outer) surface 34 of the second medium 22 back to the light sensor 154. For the reflected beam Lr-34, the angle of incidence with the fourth surface 34 of the second medium 22 will equal the angle of the reflection back towards the light sensor 154.

As the light L passes through the second medium 22, the light L contacts the third (inner) surface 33 of the second medium 22, and a portion Lr-33 of the light beam L is reflected by the third surface 33 of the second medium 22 back to the light sensor 154.

A further portion of the beam L portion is refracted into the next medium (i.e., the gap 24) and contacts the coating 12 on the second surface 32 of the first medium 21. A reflected beam Lr-12 is reflected back to the light sensor 54.

A still further portion of the beam L portion passes through the coating 12 and is refracted into the first medium 21. A reflected beam Lr-32 is reflected from the first (inner) surface 32 back to the light sensor 154.

A still further portion of the beam L portion is passes through the first medium 21. A reflected beam Lr-31 is reflected from the first (inner) surface 31 back to the light sensor 154.

It should be appreciated that the spacing between the light source 152 and the light sensor 154 will depend on the angle of the light beam L relative to the surfaces 31, 32, 33, 34 of the first and second mediums 21, 22 and the width of the gap 24 between the first and second mediums 21, 22. For example, if the angle of incidence between the light beam L and the fourth surface 34 of the second medium 22 increases from 30° to 45°, the spacing between the light source 52 and the points that the reflected beams "Lr" impinge on the light sensor 154 also will increase.

It is to be understood, that in certain embodiments, a filter 170 is incorporated into the path of the incident light L and/or reflected beams Lr. The filter 170 reduces the influence of ambient light by passing the beams and blocking passage of much of the ambient light. Also, the reflected beams Lr may be filtered to remove various light frequencies before they impinge on the light sensor 154.

It is to be understood that the light sensor 154 can include an array of elements (e.g., pixels) which detect the location, and strength of each reflected beam Lr. For example, the light sensor 154 may be one or more photosensors or a CCD or CMOS arrays. The photosensors may be, for example, of a type which produce an analog signal having an output magnitude which is a function of the energy detected in the reflected light beam or of a type which produces a signal having a frequency which is a function of the detected energy in the reflected light beam.

In certain embodiments, the light sensor 154 is configured to be movable to a position that is at near normal incidence to reflected light energy Lr prior to the light source 152 generating light energy toward the at least one transparent and/or translucent medium 22, 23. For example, the light sensor 154 can be movably attached within the housing 164 by at least a first mounting fixture 166. The first mounting fixture 166 can be configured to position the light sensor 154 at near normal incidence to the reflected light energy Lr's. The light sensor and/or the first mounting fixture 166 can be operatively connected to the processor 160 (described further herein below) to control such movements. For example, the processor 160 can include a printed circuit board and other elements useful to carry out the measurements and processes described herein.

In certain embodiments, the light energy source 152 is movably attached within the housing 164 by at least a second mounting fixture 168 that is configured to allow the light energy source to direct light energy so that the reflected light Lr's contact the light sensor 154 at near normal incidence. In certain embodiments, the first 166 mounting fixture and the second mounting fixture 168 are configured to move each of the light sensor 154, and the light energy source 152, respectively, independently of each other, either simultaneously or sequentially.

Referring now generally to the processor, the locations and strengths of the reflected beam Lr's can be fed into the processor 60 for evaluation. Although the following description refers to the processor 160, it should be noted that the invention is not limited to any particular type of programmed device and that the programming may be by software, firmware or hard wiring. The processor 160 mathematically evaluates the characteristics of each reflected beam Lr. An algorithm that can incorporate location, peak values, intensity and weightings of each sensing element in the light sensor 154 that is affected by the reflected beam determines the presence and location of the coating 12. It is to be understood that multiple concentrated light sources may be used to define the type of coating, in addition to coating presence and location of such coating.

Further, in certain embodiments, the electronics or program data for the processor 160 may be pre-calibrated; and in other embodiments, may be "trained" in the field. For repeating applications, thresholds may be determined that can be set prior to shipping the detection system 140 to the customer for a specified application. For varying conditions, the detection system 140 may be delivered to the customer without any preset thresholds. Once in use, the detection system 140 can be used with various types of mediums and appropriate data can stored for each type of medium. For example, such variations could include single and multiple panes of glass with no surface coatings and with coatings on different surfaces. The processor 160 can store the variations in memory, and can then be able to identify each type of medium by comparing the refraction data for the medium with the stored data. For example, depending on the desired information, the processor 160 may use any combination of the following reflection data: slope relationship of multiple frequency light sources; the absolute value of the reflected signals due to different surfaces of the medium under test; the ratio of reflected energy from each surface of the medium under test; and/or the absolute power amounts of multiple surface reflections that have combined together on a linear type sensing array.

Once the detection system 140 has evaluated the beam reflections Lr, the results can be displayed via various indicators on a control or display panel 162. In addition, or alternately, one or more output ports can be provided on the detection system 140 to supply data to an outside processor (not shown).

Also, in certain embodiments, the detection system 140 can further be configured for collecting information about the number of sheets of mediums (e.g., glass panes) being tested. For example, the collection of information on the number of sheets can be done with the detection system 140 itself. In another example, the number of sheets of the medium(s) can be manually entered into the detection system 140 via the control or display panel 162. For example, in certain embodiments, the knowledge that there is one versus two panes, could prevent the detection system 140 from wrongly registering a "FAR" condition when there is no far pane of glass, causing the meter to default to a "CLEAR" reading (i.e., correctly).

Also, in certain embodiments, the light source 152 can provide light L having different frequencies and/or wavelengths. Light from the different wavelength light sources will be reflected differently by different surface coatings. In other words, although two different coating materials may reflect the same magnitude or weighting of light at one light wavelength, they will reflect different magnitudes or weightings of light at a different light wavelength. The light source(s) 152 and/or light sensor(s) 154 can be arranged so that light from each source which is reflected by the mediums and/or coatings impinge on a particular sensor and can be independently measured. Further, if a single light sensor 154 is provided for two or more different wavelength light sources, the light source(s) 152 can be alternately pulsed on so that the light sensor(s) 154 detect(s) the energy level in reflected light from only one frequency light source 152 at a time.

It should be appreciated that there are alternate ways for measuring the reflected energy level at different wavelengths. For example, LED's are available which can be operated to produce light having either of two different colors. By switching the light source between different wavelengths, the light sensor 154 can measure the energy level in the surface reflections at the different wavelengths. Alternately, the light source 152 may produce a broad spectrum of wavelengths. Different filters (not shown) may be used for selectively passing to the light sensor 154 reflections of different wavelengths or of different bands of wavelengths in the surface reflections.

Also, in certain embodiments, when multiple light sensors 154 are provided, the outputs from the light sensors 154 are combined to produce reflected energy data for each wavelength. The total reflected energy for one wavelength may be used to determine if one or more of the reflected amplitude signals indicates the presence, location, and/or type of a coating.

Thus, the reflected light Lr is used not only to determine whether the coating 12 is present, but also to measure the thickness of the first and second mediums, the width of the gap between the first and second mediums, and/or the thickness of the coating 12. Thus, if the coating 12 is present, the angle of the reflected light and the receiving of energy Lr indicates the location of the coating 12.

It is to be appreciated, in embodiments have the capacitance-measuring sensor 142, the measured reflected energy Lr from each surface 31, 32, 33, 34 determines the presence and location of the coating 12. The resulting measured reflected energy is then correlated with the capacitance-measuring sensor 142 to determine the type of coating; for example, whether the coating 12 is a conductive LOW E coating or a non-conductive self-clean coating. Since LOW E coatings are conductive, if the LOW E coating is present, the capacitance-measuring sensor 142 will detect it. The capacitance-measuring sensor 142 cannot detect a non-conductive coating. Therefore, the results from the capacitance-measuring sensor 142 can then be used in correlation with the light sensor 154. Thus, the detection system 40 can additionally use the capacitance-measuring sensor 142 in correlation with the thickness-measuring sensor 144 to determine coating location(s), conductivity, type(s) of coatings, and analytical value(s). For example, the peak values, intensity and weightings of each sensing element in the thickness-measuring sensor 144 can be determined. Also, as previously indicated herein, other measurements from the reflection data: slope relationship of multiple frequency light sources; the absolute value of the reflected signals due to different surfaces of the medium under test; the ratio of reflected energy from each surface of the medium under test; and/or the absolute power amounts of multiple surface reflections.

In certain embodiments, the detection system 140 can either include or be in communication with a computer system (not shown) configured to analyze results generated by the thickness-measuring sensor 144 and the capacitance-measuring sensor 42. In certain embodiments, the values may be taught to a microcomputer by testing samples of the different coatings and of different surface coating locations for various samples of glass or other transparent material and for various commercial composites. The presence, location and/or type of a coating are determined by comparing the surface reflection energy levels with the stored information for the different samples.

In use, the detection system 140 is positioned flat against the surface of one medium so that the light energy L strikes the medium's front and back surfaces and reflecting back onto the light sensor. In the embodiment illustrated in FIG. 2, the light sensor 154 is depicted as a CCD array and the reflections Lr's are measured by the pixel elements of the CCD array. The results of the measured reflections are forwarded to the processor 160 which can store the calibration data to know the true distance between the reflections that are measured by the CCD array to yield the resulting thickness of the medium. The distances between the different measured reflections on the CCD array are converted into the actual thickness of the medium being tested.

It is important to realize that different mediums and/or gaps will result in different indexes of refraction that will, in turn, shift or alter the reflecting angle of the energy source and the reflections as they pass from medium to gap space boundaries. When the medium and gap space indexes of refraction are known and/or measured, the detection device 140 can yield accurate thickness measurements for both the gap space and the medium.

Figure 3:
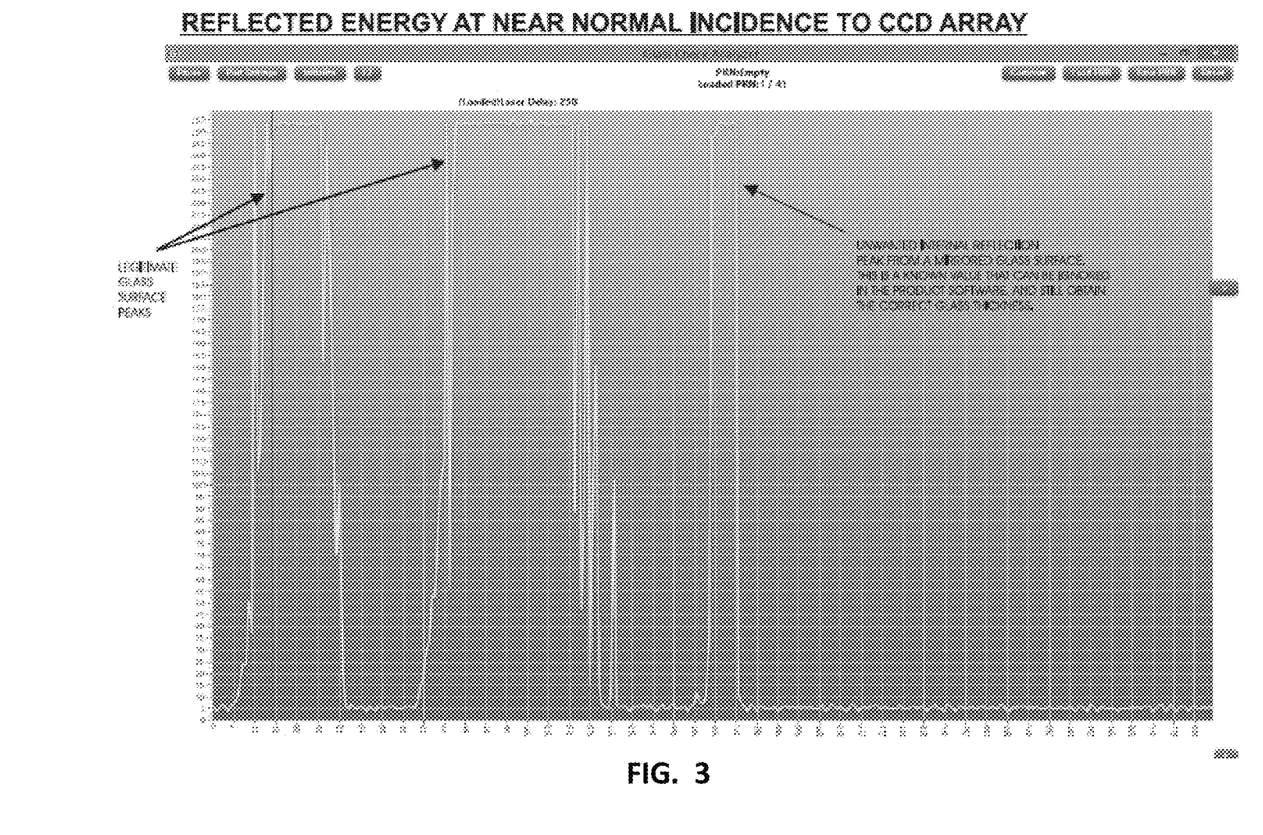
FIG. 3 is an illustration showing reflected energy at near normal incidence to a light sensor, using an apparatus of FIG. 2.
Figure 4:
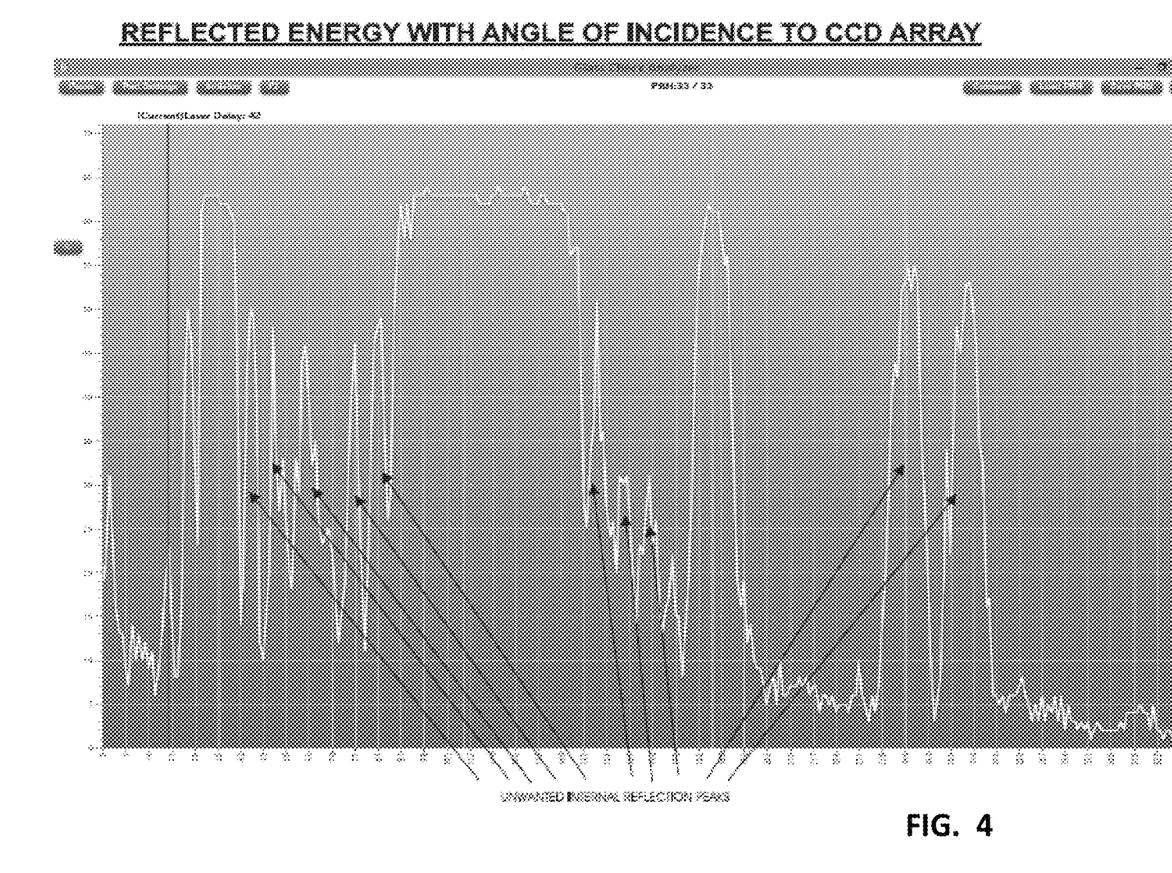
FIG. 4 is an illustration showing reflected energy at near normal incidence to a light sensor, using an apparatus of PRIOR ART FIG. 1.

An example of what the measured signals look like at a near normal incidence is shown in FIG. 3 where several legitimate glass surface peaks are shown on the left side of the reading. It is to be noted that the far right peak is an unwanted internal reflection peak from a mirrored glass surface; as this is a known value, it can be ignored, and the correct glass thickness can still be obtained. In contrast, an example of what the measured signals look like at an incident angle shown in FIG. 4, where there are multiple unwanted internal reflection peaks.

Mirror Embodiment

One or more mirrors can be used to re-direct the reflected energy to hit the light sensor at near normal incidence.

It is to be understood that several configurations are useful with the measuring apparatus described herein. For example, with regard to the position of the light sensor in a relationship away from the opening, it is to be understood that, when a sensor has a relatively long configurations, in order to achieve the desired angle created for receiving near normal reflections, the height of the housing 164 may need to be larger (i.e., further away from the opening 165 in the housing 164). In certain embodiments, the light sensor 154 can be mounted in a parallel on the processor 160, and in certain embodiments, the light sensor 154 can be positioned at an angle (e.g., in the x-, y- and/or z-axis directions with respect to an angle defined by the plane of the medium surface 22). When the light sensor 154 is positioned as such angle, the reflected light LR's can be directed to the light sensor 154 using, for example, mirrors, right angle prisms etc. to orient the reflected light Lr's entering the light sensor 154 at near normal again.

Further, this technique makes it possible to measure more difficult mediums such as laminate inner-layers that are placed between glass surfaces that yield a faint amount of energy from the glass-to-laminate junction due to a close match in index of refraction. Eliminating the extra internal reflections allows the legitimate laminate inner-layer surfaces to be accurately determined.

While the invention has been described with reference to a preferred embodiment, it should be understood by those skilled in the art that various changes may be made and equivalents may be substituted for elements thereof without departing from the essential scope of the invention. In addition, many modifications may be made to adapt a particular situation to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims.

What we claim is:

1. An apparatus for measuring thicknesses of at least two transparent or translucent mediums that have matching or similar indices of refraction, and for measuring the index of refraction between the two mediums, comprising:
    at least one light energy source configured for directing at least one incident beam of light energy to a first transparent and/or translucent medium having first and second surfaces, and to at least a second transparent and/or translucent medium having first and second surfaces; and,
    at least one light sensor configured to receive separate beams of reflected light energy reflected from each of the first and second surfaces of each the first and second transparent and/or translucent mediums and configured to measure the index of refraction between the two mediums;
    the light sensor being positioned at an angle is at normal or near normal incidence to the received separate beams of reflected light energy, such that:
    when reflected light energy from the received beam is received at a normal incidence, there is no further reflection of said normal-incidence received beam received by the light sensor; and,
    when reflected light energy from the received beam is received at near normal incidence, any further reflection of said near normal beam essentially stays within an original ray of travel of the incident beam and reinforces the reflected light energy from the received near normal beam,
    thereby reducing unwanted internal reflections of the received beams of reflected light energy received by the light sensor.

2. The apparatus of claim 1, further including at least one reflective medium positioned to cause the reflected light energy to be reflected to the light sensor at a near normal or normal incidence.

3. The apparatus of claim 1, wherein the light sensor is configured to be movable to a position prior to the light source generating light energy toward the first and second transparent and/or translucent mediums.

4. The apparatus of claim 1, further including a housing,
the light sensor being movably attached within the housing by at least a first mounting fixture configured to position the light sensor, and,
the light energy source being movably attached within the housing by at least a second mounting fixture configured to allow the reflected light to contact the light sensor.

5. The apparatus of claim 4, wherein the first and second mounting fixtures are configured to move each of the light energy source and the light sensor independently of each other.

6. The apparatus of claim 1, wherein the light sensor comprises a 2-dimensional array.

7. The apparatus of claim 1, further including at least one filter positioned between the light sensor and the reflected light energy.

8. The apparatus of claim 1, wherein the filter comprises a bandpass filter or a notch filter.

9. The apparatus of claim 1, wherein the light sensor comprises a charge coupled device (CCD) array, complementary metal oxide silicon (CMOS) array or a photodiode array comprised of a plurality of light sensing elements.

10. The apparatus of claim 1, wherein the light sensor is further configured to measure three or more transparent and/or translucent mediums.

11. The apparatus of claim 1, wherein the light sensor is further configured to measure a width of a gap between two spaced-apart transparent and/or translucent mediums.

12. The apparatus of claim 1, wherein the light sensor is further configured to measure a reflected beam of light energy when one or more of the transparent and/or translucent mediums have a coating on at least one surface.

13. The apparatus of claim 1, further including a processor configured for correlating a width of a gap between two spaced-apart transparent and/or translucent mediums.

14. The apparatus of claim 1, wherein the light sensor comprises a charge coupled device (CCD) array having of a plurality of sensor elements configured to regulate energy carryover effects from one sensor element to another sensor element.

15. The apparatus of claim 1, wherein the light sensor is at an angle in any one of x-, y- and/or z-axis directions with respect to an angle defined by the plane of the first medium surface, and the apparatus further including one or more elements positioned to reflect light to the light sensor to orient the reflected light entering the light sensor at normal or near normal incidence.

16. The apparatus of claim 1, further including:
a capacitive-measuring sensor configured to generate a capacitance value in the presence of a conductive layer on a surface of at least one non-conductive medium; and,
a processor configured for identifying the presence and surface location of one or more conductive coatings on at least one surface of the non-conductive medium by correlating a value of the capacitance measured with the thickness of the non-conductive medium.

17. A method for measuring thicknesses of at least two transparent or translucent mediums that have matching or similar indices of refraction, and for measuring the index of refraction between the two mediums, comprising:
directing at least one incident beam of energy to a first transparent and/or translucent medium having first and second surfaces, and to at least a second transparent and/or translucent medium having first and second surfaces; and,
providing a light sensor configured to receive separate beams of reflected light energy reflected from each of the first and second surfaces of each the first and second transparent and/or translucent mediums and configured to measure the index of refraction between the two mediums;
the light sensor being positioned at an angle is at normal or near normal incidence to the received separate beams of reflected light energy, such that;
when reflected light energy from the received beam is received at a normal incidence, there is no further reflection of the received beam received by the light sensor; and,
when reflected light energy from the received beam is received at near normal incidence, any further reflection of said near normal beam essentially stays within an original ray of travel of the incident beam and reinforces the reflected light energy from the received near normal beam, thereby reducing unwanted internal reflections of the received beams of reflected light energy received by the light sensor.

18. The method of claim 17, further including moving the light sensor to a position prior to the light source generating light energy.

19. The method of claim 17, including moving both the light energy source and the light sensor, either simultaneously, or sequentially.

20. The method of claim 17, wherein the method includes positioning at least one reflective medium so as to re-direct the reflected light energy to the light sensor.

* * * * *